A. R. Wixom — Potato Digger.
109093     Fig. 1.     PATENTED Nov 8 1870
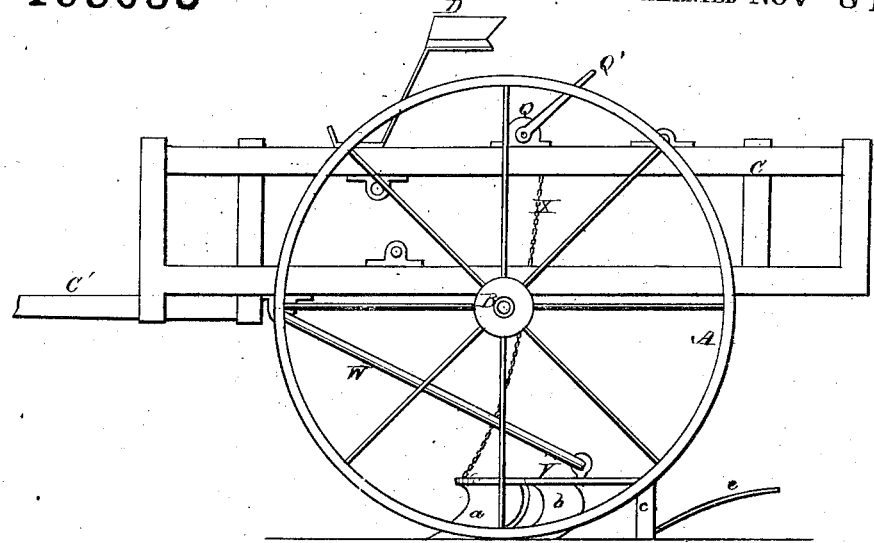
Fig. 2.
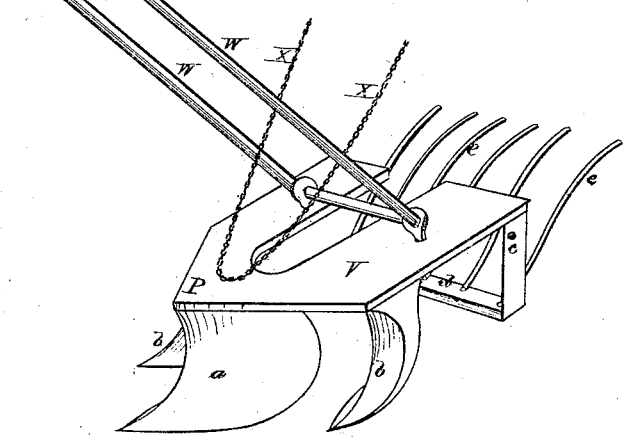
Witnesses.
Inventor.
Albert R. Wixom
by Pindle & Dyer
Associate Attys.

United States Patent Office.

ALBERT R. WIXOM, OF FARMINGTON, MICHIGAN.

Letters Patent No. 109,093, dated November 8, 1870.

IMPROVEMENT IN POTATO-DIGGERS.

The Schedule referred to in these Letters Patent and making part of the same.

*To whom it may concern:*

Be it known that I, ALBERT R. WIXOM, of Farmington, in the county of Oakland and State of Michigan, have invented a new and useful Improvement in a Combined Potato-Planter and Digger; and I do declare that the following is a true and accurate description thereof, reference being had to the accompanying drawing and to the letters of reference marked thereon, and being a part of this specification, in which—

Figure 1 is a side elevation of the implement arranged as a potato-digger.

Figure 2 is a perspective view of the gang of plows used in digging.

Like letters indicate like parts in each figure.

The nature of this invention relates to an implement provided with certain attachments, by the employment of which it may be used in digging potatoes.

The invention consists in the peculiar construction and arrangement of a gang of plows for digging up the hills, sifting out and leaving the tubers on the surface of the soil, and in the construction and arrangement of the frame for the reception and operation of the excavating mechanism, as may be required.

In the drawing—

A represents traction-wheels, rigidly secured to the ends of the axle B, properly journaled in boxes under the lower sills of the double rectangular frame C, to which is attached the usual draft-pole C'.

D is a seat for the driver.

Q is a drum, provided with hooks, and is journaled in the top of the frame at the rear of the seat; it is provided with a lever, Q', by which the driver may rotate it in its bearings.

In the forward part of the frame are two eye-bolts, in which is pivoted the gang of excavating-plows, V, by means of the rods W, which are also connected by the chains X to the windlass, permitting of its being raised clear of the ground when desired.

The construction of this gang will be fully understood by reference to the third figure of the drawing, in which a double mold-board plow, $a$, is shown at the point or apex of the frame P, flanked on either side by a single one, $b$, of the peculiar form shown.

At the rear corners of the frame are fixed depending standards, $c$, across which is secured a horizontal hoe-plate, $d$, from which a series of fingers, $e$, curve upward and backward.

The plow $a$ splits and loosens up the soil of the hill; the halves are then again divided by the side-plows $b$, which throw inward loosened soil of the hill proper with its contents, while the outer portion of the hill, which contains no potatoes, will be thrown aside. The entire mass is now taken up by the hoe-plate $d$, which transfers it to the grating formed by the fingers $e$, through which the loosened and pulverized earth sifts, while the potatoes are discharged on top of the ground, ready to be gathered up in baskets or otherwise.

What I claim as my invention, and desire to secure by Letters Patent, is—

1. The gang of plows $a\ b\ b$, standard $c$, hoe-plate $d$, and fingers $e$, attached to a frame or plate V, and the bars W, as and for the purpose set forth.

2. The combination of the frame C, axle B, traction-wheels A, windlass Q, lever Q', and chains X, with the plows $a\ b\ b$, standard $c$, hoe-plate $d$, fingers $e$, plate V, and bars W, constructed and arranged substantially as described and shown, for the purposes set forth.

ALBERT R. WIXOM.

Witnesses:
FREDERICK EBERTS,
GEO. SPENCE.